(12) United States Patent
Eslick et al.

(10) Patent No.: US 9,946,034 B1
(45) Date of Patent: Apr. 17, 2018

(54) CONTAMINATION PREVENTION SYSTEM FOR FIBER OPTIC CABLING

(71) Applicant: Amazon Technologies, Inc., Seattle, WA (US)

(72) Inventors: Jason Eslick, Brush Prairie, WA (US); Alan Michael Judge, Dublin (IE); Alaa Adel Mahdi Hayder, Seattle, WA (US); Colin John Whittaker, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/473,512

(22) Filed: Mar. 29, 2017

(51) Int. Cl.
*G02B 6/36* (2006.01)
*G02B 6/38* (2006.01)

(52) U.S. Cl.
CPC ......... *G02B 6/3849* (2013.01); *G02B 6/3866* (2013.01); *G02B 6/3893* (2013.01)

(58) Field of Classification Search
None
See application file for complete search history.

(56) References Cited

U.S. PATENT DOCUMENTS

| | | | | |
|---|---|---|---|---|
| 4,162,119 A * | 7/1979 | Goodman | ............ | G02B 6/3849 340/641 |
| 6,530,696 B1 * | 3/2003 | Ueda | ............ | G02B 6/3885 385/59 |
| 7,927,023 B2 * | 4/2011 | Moriarty | ............ | G02B 6/3809 385/139 |
| 8,393,802 B2 * | 3/2013 | Stanley | ............ | G02B 6/3866 385/134 |
| 2006/0210224 A1 * | 9/2006 | Koreeda | ............ | G02B 6/3849 385/70 |
| 2012/0082417 A1 * | 4/2012 | Stanley | ............ | G02B 6/3866 385/77 |
| 2012/0219253 A1 * | 8/2012 | Arishima | ............ | G02B 6/3825 385/76 |
| 2013/0308907 A1 * | 11/2013 | Lin | ............ | G02B 6/3849 385/59 |
| 2014/0270679 A1 * | 9/2014 | Scea | ............ | G02B 6/3849 385/139 |
| 2016/0259132 A1 * | 9/2016 | Ling | ............ | G02B 6/3866 |
| 2017/0097472 A1 * | 4/2017 | Miller | ............ | G02B 6/3849 |

* cited by examiner

*Primary Examiner* — Michelle R Connelly
(74) *Attorney, Agent, or Firm* — Kilpatrick Townsend & Stockton LLP

(57) ABSTRACT

A plug may be coupled with a cable and include a fiber ferrule extending from the plug. A biasing mechanism may be arranged to bias a cover toward a covered configuration in which the fiber ferrule is situated within an internal volume defined by the cover and away from an uncovered configuration in which the fiber ferrule is situated at least partially outside of the internal volume defined by the cover. Bristles or other blockers may be positioned along or within a boundary of the internal volume of the cover, may be arranged to block particulate entry through the blockers into the internal volume of the cover in the covered configuration, and may be movable to permit passage of the fiber ferrule through the blockers in response to movement of the cover between the covered configuration and uncovered configuration.

20 Claims, 4 Drawing Sheets

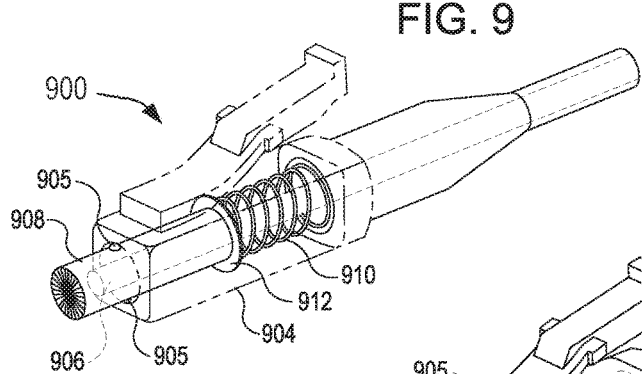
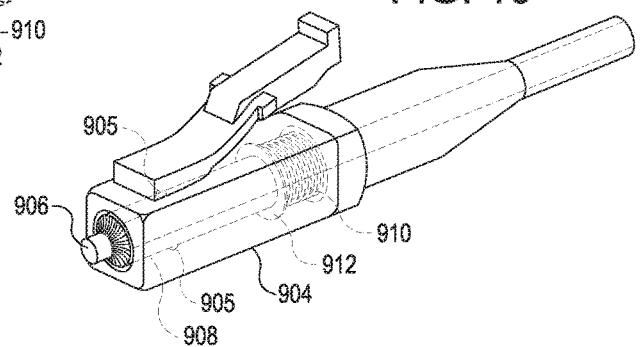
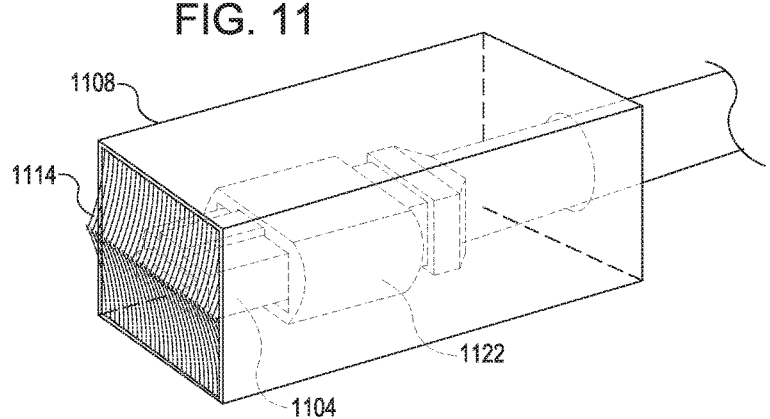
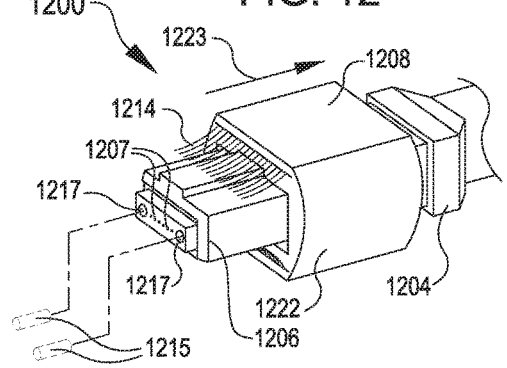
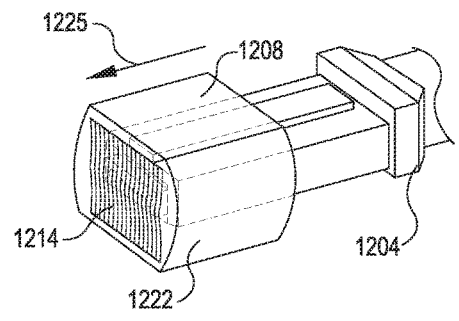

CONTAMINATION PREVENTION SYSTEM FOR FIBER OPTIC CABLING

BACKGROUND

Datacenters house collections of servers and networking hardware, including switches and routers. Often many different cabled connections between components are used to connect the components, for example, to permit data transfer between the components. The number of connections for any given component can quickly become nontrivial as one component may connect to tens or hundreds of other components through such cabled connections. If any of these many connections are inadequate (e.g., if a cable or connector is fouled by dust or otherwise damaged), functionality of components within a server cluster may be negatively impacted, for example, causing reduction in network capacity, speed, or reliability, or, in some cases, even preventing the components from functioning as a network at all.

In many situations, installers may prepare to connect components by laying out a large number of cables that are then individually installed into appropriate sockets in the components. Significant amounts of dust, debris, or other foreign particulate may be kicked up as installers move about the laid out cables. Such foreign particulate may foul or otherwise cause damage to the cables or couplers used to connect cables to respective components. For example, for optic cables, foreign particulate can cause damage to the surface of the optic cable including scratching, pitting, obscuring, etc. Damage points may result in loss of signal quality and ultimately, underperforming or error prone connections.

Accordingly, many cables feature removable caps mounted on cable connectors to reduce exposure to dust or other foreign particulate during transport and/or installation of the cables. In practice, such caps can be removed to expose fiber optic ferrules or other sensitive couplers, for example, just before installation into respective components. However, such caps may be prematurely removed or lost and thus in many cases fail to block exposure to dust or other foreign particulate that may negatively affect cables, couplers, and/or networks.

BRIEF DESCRIPTION OF THE DRAWINGS

Various embodiments in accordance with the present disclosure will be described with reference to the drawings, in which:

FIG. 9 is a perspective view of a contamination prevention system with a cover arranged around a fiber ferrule and sized to fit within a plug body according to certain embodiments;

FIG. 10 is a perspective view of a contamination prevention system with fiber ferrule extending outside of a cover positioned within a plug body according to certain embodiments;

FIG. 11 is a perspective view of a contamination prevention system for a plug with a fiber ferrule having multiple light transmission passageways according to certain embodiments; and FIGS. 12-13 are perspective views of a contamination prevention system that features a collar of a plug as a movable cover for a fiber ferrule according to certain embodiments.

DETAILED DESCRIPTION

Figure 1:
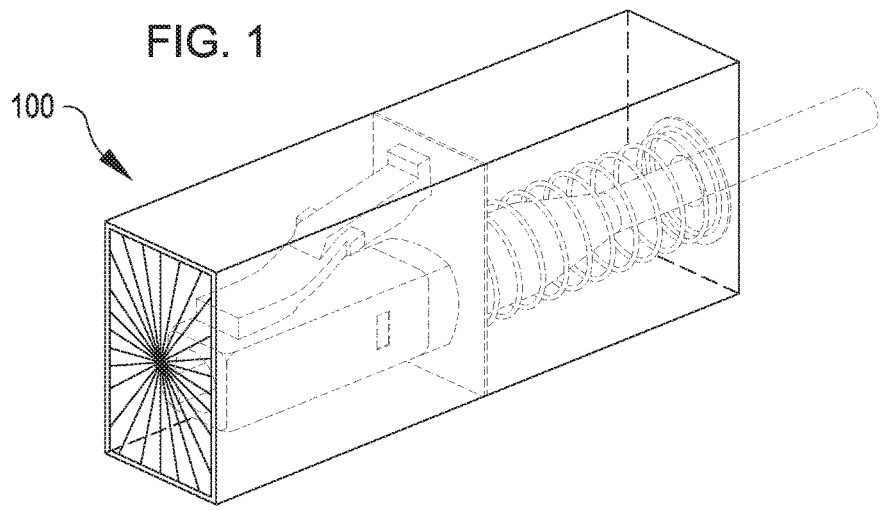
FIG. 1 is a perspective view of a contamination prevention system for a cabling arrangement according to certain embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to contamination prevention systems for cabling arrangements and components thereof. A cabling arrangement can include a protective cover, for example, which functions to protect a fiber ferrule incorporated into a plug at the end of a cable. The cover can have a tube shape or other appropriate shape for extending around the fiber ferrule. The cover may be biased by a spring or other biasing mechanism. For example, the biasing mechanism may be arranged to cause the cover to be self-closing to automatically cover a fiber ferrule when a corresponding plug is removed from a socket in an appliance, such as a computer server or network hardware component of a data center. The cover may include a set of bristles, fibers, or other blockers that separate an inside of the cover from an outside of the cover. As non-limiting examples, the set may include micro-fiber layered strips, cleaning paper, lint-free cloth, or other suitable materials incorporated into bristles, flaps, tendrils, or other suitable structures. In operation, the bristles etc. can block off a passage to the inside of the cover and prevent dust or other debris from reaching the fiber ferrule when the fiber ferrule is positioned inside the cover. When occasion arises to position the fiber ferrule outside of the cover (e.g., so that the ferrule can be received into a socket for establishing a connection between hardware components), movement of the cover relative to the fiber ferrule may cause the ferrule to press against the bristles and push the bristles apart, allowing the fiber ferrule to pass through the bristles and into the socket or to otherwise extend out of the cover. When the ferrule is retracted back into the cover (e.g., upon being removed from the socket), the bristles may move or bend to allow the fiber ferrule to pass through. A resiliency of the bristles may cause the bristles to then flex back into the arrangement that forms the barrier against entry of dust or other particulate into the inside of the cover where the fiber ferrule has just been received. As a result, the spring-loaded or otherwise biased cover and bristles may provide a prompt and automatic dust cover for the fiber ferrule and significantly reduce a risk of damage that might otherwise be present with longer exposure of the fiber ferrule to environments that may include problematic particulate. In some examples, the bristles may additionally or alternatively provide a cleaning function for brushing dust or other particulate away from the fiber ferrule.

Figure 2:
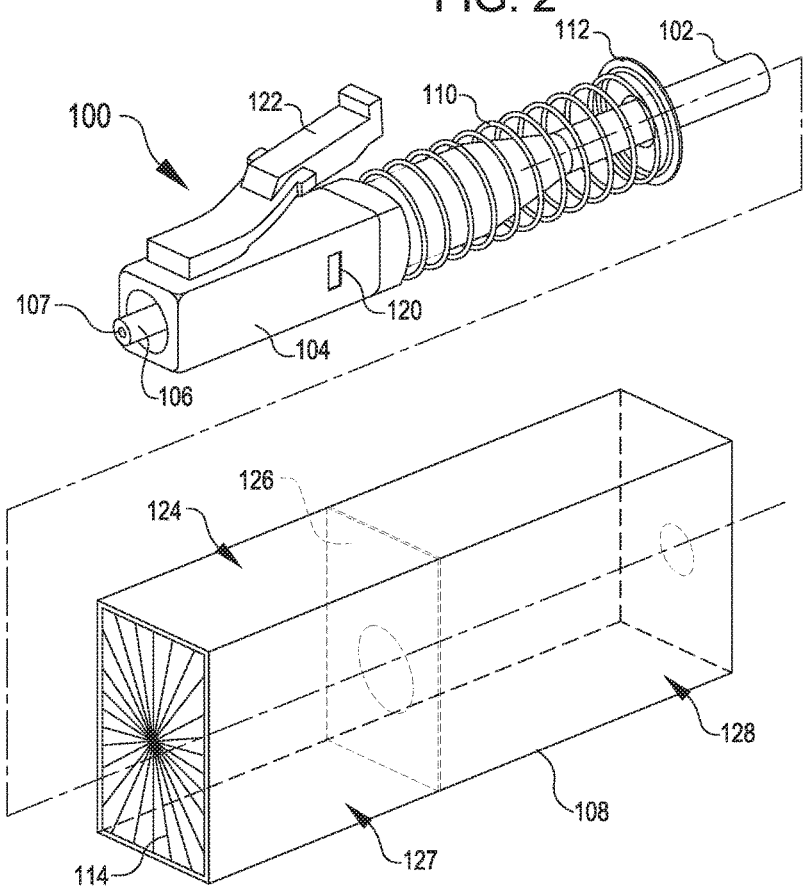
FIG. 2 is an exploded assembly view of a contamination prevention system according certain embodiments.

Referring now to the figures, FIG. 1 illustrates an example of a contamination prevention system 100 in an assembled state, and FIG. 2 illustrates the system 100 in an exploded assembly view in which various elements are identified by particular reference numbers. In FIG. 2, the illustrated system 100 includes a cable 102 terminating in a plug 104 in which a fiber ferrule 106 is located, a cover 108, a biasing mechanism 110, a base 112, and blockers 114. The system 100 is also shown in various states in FIGS. 3-6 as described in greater detail below, and may also include other features, such as an appliance 116 and a corresponding socket 118 as in FIGS. 3-5.

The cable 102 may provide a suitable conduit for transfer of electrical power, data, and/or other signals between appliances (such as between servers and/or network hard drive components for a data center). The cable 102 can include suitable wiring, optical fibers, and/or other conduits for transmitting electrical power, data, and/or other signals there through. For example, when the plug 104 is suitably engaged with the socket 118 of an appliance 116, the cable 102 may carry power, data, or other signals to or from that appliance 116. Although the cable 102 and associated components depicted and described herein may be particularly suited for optical transmissions, in some aspects, the cable 102 may be replaced with and/or include a conduit for other connection types, in addition or as alternatives, such as connections for acoustic communication, fluid communication, and/or electrical communication. For example, although the cover 108 is described herein as primarily utilized to protect a sensitive fiber ferrule 106 of the plug 104, the cover 108 may additionally or alternatively be utilized to protect any other sensitive component at a terminus or other portion of a relevant conduit or member.

The plug 104 may be located at an end of the cable 102. The plug 104 can include a transceiver or other appropriate structure for establishing sufficient connection between the plug 104 and the socket 118 for transferring data, power, etc. between the cable 102 and respective appliance 116. For example, the transceiver may correspond to a small form-factor pluggable (SFP) transceiver, such as is commonly used for telecommunication and/or data communications applications. In further embodiments the transceiver comprises an enhanced small form-factor pluggable (SFP+) transceiver or a compact small form-factor pluggable (CSFP) transceiver. In additional embodiments the plug 104 comprises an RJ45 connector or a similar connector. In some embodiments, the plug 104 may include a fiber ferrule 106. Non-limiting examples of plugs 104 that may include fiber ferrules 106 are LC connectors, QSFP connectors, or MPO connectors. Generally, the fiber ferrule 106 may correspond to any structure that at least partially surrounds a glass core of a fiber optic line. Typically, the fiber ferrule 106 will include at least one opening or other light transmission passageway 107 through which light conveyed by a fiber optic core can travel into or out of the core, such as to or from another fiber optic cable or a compatible device or adaptor. Although the fiber ferrule 106 shown in FIGS. 1-2 extends outward from a body that defines a substantial other portion of the plug 104 (e.g., consistent with an LC connector), the fiber ferrule 106 is not so limited and may be arranged in any suitable relationship to the plug 104, including, but not limited to, extending from an edge of the plug 104, recessed from an edge of the plug 104, or flush with an edge of the plug 104. Moreover, the fiber ferrule 106 may include one, two, more than two, or any suitable number of light transmission passageways 107. For example, while FIG. 2 illustrates a fiber ferrule 106 having a single light transmission passageway 107 (e.g., consistent with an LC connector), FIG. 12 illustrates a fiber ferrule 1206 having multiple light transmission passageways 1207 (e.g., consistent with an MPO connector, which typically feature four to twenty-four fibers and corresponding transmission passageways per fiber ferrule).

The plug 104 may be secured in the socket 118 by a latch mechanism. The latch mechanism may include multiple latch mechanism parts 120. For example, the latch mechanism parts 120 may include a first latch mechanism part attached to the socket 118 and a second latch mechanism part attached to the plug 104. The latch mechanism parts 120 may secure the plug 104 in the socket 118 in a seated configuration. As an illustrative example, the latch mechanism parts 120 may include a groove in the socket 118 and a ramped, spring loaded prong on the plug 104 that can be retracted to permit removal of the plug 104 relative to the socket 118. However, the latch mechanism parts 120 can include any structure that prevents motion or removal of the plug 104 until released, including, but not limited to, any pin or flange that may be biased toward or away from particular states, for example due to resilience of the component or due to forces exerted by other associated components. Moreover, although the socket 118 is described above as pertaining to a part of an appliance 116, the socket 118 may additionally or alternatively correspond to a coupler, an intermediate patch panel, another cable, some passive optical element, or any other structure that may include a socket 118 for receiving the plug 104.

A release mechanism 122 operable to disengage the latch mechanism parts 120 can also be included. For example, in the embodiment shown in FIG. 2, the release mechanism 122 includes a handle or lever that can be actuated to retract prongs of the latch mechanism parts 120, e.g., so that that the plug 104 can be retracted away from a fully seated configuration in the socket 118. Construction of such release mechanisms 122 is known, and accordingly internal configuration or other details relating to the interaction of the release mechanism 122 and the latch mechanism parts 120 is not included herein. Additionally, although the release mechanism 122 is shown as a solid, depressible, elongate member in the embodiment depicted in the figures, other options are possible in addition or as alternatives, including but not limited to buttons, pull cords, loops, or other structures that can be gripped or manipulated by an operator and/or manipulated by a tool for movement relative to the plug 104. Furthermore, although the release mechanism 122 is shown on the plug 104, the release mechanism 122 may additionally or alternatively be included elsewhere, including, but not limited to, in a position associated with the socket 118.

The cover 108 defines an internal volume 124. In the illustrated embodiment, the internal volume 124 is bounded by rectangular walls. However, the cover 108 can include any shape of structure to define an internal volume 124 in which at least the otherwise exposed portion of the fiber ferrule 106 (or other sensitive element) can be received. Non-limiting examples include tubes, cylinders, troughs, and channels. The illustrated cover 108 also features an internal wall 126 that subdivides the internal volume 124 into a front volume 127 and a rear volume 128. For example, the cover 108 may be installed so that the biasing mechanism 110 and the base 112 are positioned in the rear volume 128 and so that the plug 104 can move into or out of the front volume 127.

The biasing mechanism 110 is illustrated in FIG. 2 as a spring but may correspond to any structure that can bias the cover 108 toward a particular position. Example operation of the biasing mechanism 110 relative to the cover 108 is discussed in greater detail with respect to FIGS. 3-6 below. In the embodiment illustrated in FIGS. 1-6, the biasing mechanism 110 is positioned between the internal wall 126 of the cover 108 and the base 112. The base 112 is depicted as a disc mounted to the cable 102, but may correspond to any fixed structure against which the biasing mechanism 110 can push or pull to provide a biasing force to the cover 108. In some embodiments, the biasing mechanism 110 may be a spring having one end cinched about the cable 102 so as to function as a base 112. The base 112 may be arranged at a fixed distance from the fiber ferrule 106, for example, so that changes in length of the biasing mechanism relative to the base 112 will cause a change in position to which the biasing mechanism 110 biases the cover 108.

The blockers 114 may be arranged along a boundary of the cover 108. For example, the blockers 114 in FIG. 2 are arranged along a front face of the cover 108 and cover a passage through that front face. Additionally or alternatively, the blockers 114 may be positioned at least partially within the internal volume 124 of the cover 108 or otherwise offset or recessed from a boundary of the cover 108. The blockers 114 may correspond to any pliable members that when provided with others may form a resilient barrier that can block relatively smaller objects (such as dust or other particulate) and move aside in response to being pressed against by relatively larger objects (such as the plug 104 and/or fiber ferrule 106). Put another way, the blockers 114 may be flexibly and resiliently bendable to allow movement of the fiber ferrule 106 through the blockers 114, e.g., flexing when the fiber ferrule 106 or plug 104 is in between blockers 114 and springing back to an unbent or at-rest arrangement when the no object is extending between the blockers 114.

The blockers 114 may incorporate any suitable structure (e.g., including, but not limited to bristles, fabric, flaps, tendrils, or other structures), but for ease of description, the blockers 114 will hereinafter be collectively referred to as bristles 114. As further non-limiting examples, the bristles 114 may correspond to a set of strands, hairs, fibers, and/or filaments. In some embodiments, the bristles 114 may correspond to or include microfibers such as are often incorporated into cleaning cloths or other products. Non-limiting examples of materials from which microfibers may be fabricated may include polyesters, polyamides (e.g., nylon, Kevlar, Nomex, trogamide), or a conjugation of polyester, polyamide, and polypropylene. Microfibers may include synthetic fiber finer than one denier or decitex thread. In some embodiments, the microfibers may be multi-stranded fibers. In various embodiments, use of microfiber bristles may prevent dust or other particulate passage and may also avoid scratching and/or otherwise damaging the fiber ferrule 106. Other forms of bristles 114 may also be implemented based on compatibility with fiber ferrules 106. For example, whereas various types of commercially available materials may pose a risk of damaging the fiber ferrule 106 (e.g., due to materials having characteristics that may cause scratching etc. or due to materials containing contaminants that may be transferred to the ferrule), bristles 114 may be fabricated with materials that are compatible with and/or beneficial to proper operation of the fiber ferrule 106. In some embodiments, bristles 114 that incorporate suitable materials may additionally or alternatively confer an advantage such as cleaning the fiber ferrule 106, for example. Non-limiting examples of materials that may be included at tips or other portions of bristles may include micro-fiber material (e.g., in layered strips), cleaning paper, and lint-free cloth.

In some embodiments, different walls or portions of the cover 108 may be constructed of differing material. As an illustrative example, in some embodiments, a top wall of the cover 108 may formed of neoprene, rubber, or other relatively more flexible material (e.g., which may allow the top to be pressed down by an operator's finger or other implement to actuate the release mechanism 122 through the cover 108), while other walls may be formed of plastic, metal, or some other relatively more rigid material (e.g., to maintain a structural integrity of the cover 108 that prevents bristles 114 from separating from one another sufficiently to permit dust entry through the bristles 114).

FIGS. 3-6 illustrate an example of the system 100 in operation. Generally, FIGS. 3-6 illustrate an example of the biasing mechanism 110 operating (upon removal of the plug 104 from the socket 118) to bias the cover 108 toward a covered configuration in which the fiber ferrule 106 is situated within the internal volume 124 defined by the cover and away from an uncovered configuration in which the fiber ferrule 106 is situated at least partially outside of the internal volume 124 defined by the cover 108.

Figure 3:
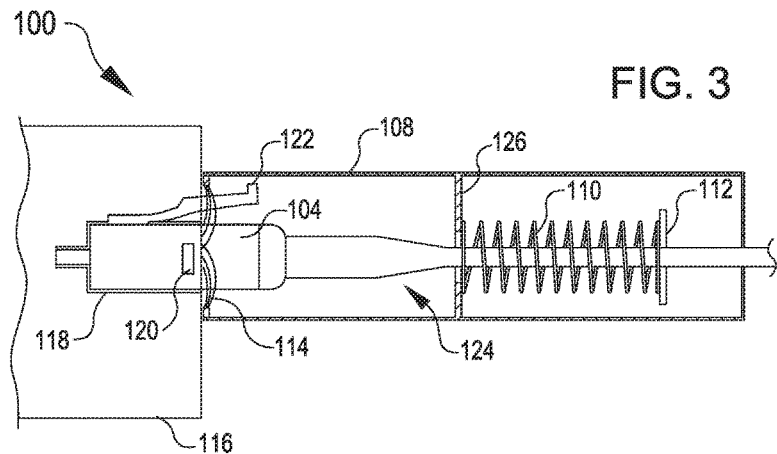
FIG. 3 is a side cut-away view showing a contamination prevention system with a cover positioned relative to a plug received in a socket according to certain embodiments.

In FIG. 3, the plug 104 is received in the socket 118 of the appliance 116 and maintained in the seated configuration by latch mechanism parts 120. The biasing mechanism 110 is moderately compressed between the base 112 and the internal wall 126 of the cover 108 and thus biases the cover 108 into contact with the appliance 116 that prevents the cover 108 from further movement. In this state, the plug 104 is partially received in the internal volume 124 and the bristles 114 are spread apart and displaced by the plug 104. Access to the release mechanism or lever 122 may be obstructed by the cover 108. The arrangement in FIG. 3 may correspond to a common state of the system 100 after the plug 104 has been installed in the appliance 116.

Figure 4:
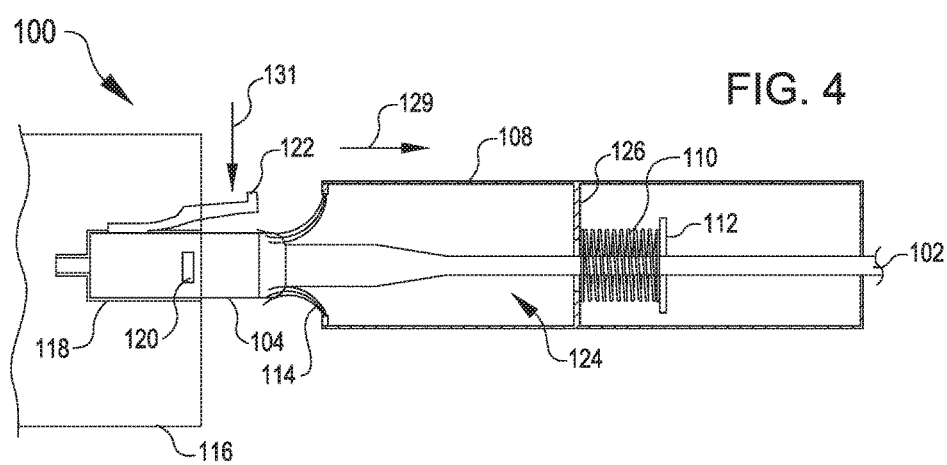
FIG. 4 is a side cut-away view showing a contamination prevention system with a cover positioned to provide access to a release mechanism for a plug according to certain embodiments.

Referring to FIG. 4, the cover 108 may be pulled back (e.g., as at arrow 129) to expose the lever 122. Pulling the cover 108 back (e.g., toward the right in FIG. 4) may cause the bristles 114 to deflect further and/or conform around the plug 104, lever 122, and/or cable 102. Pulling the cover 108 back may also cause the internal wall 126 to press against the biasing mechanism 110 and cause compression against the base 112. With the cover 108 retracted, the lever 122 may be depressed (e.g., as at arrow 131) to release engagement of the latch mechanism parts 120, which may allow or facilitate removal of the plug 104. In some embodiments, the lever or other release mechanism 122 can be actuated without first retracting the cover 108 from the appliance 116. For example, at least some part of the cover 108 may include pliable material through which the lever or other release mechanism 122 can be pressed or otherwise actuated.

Figure 5:
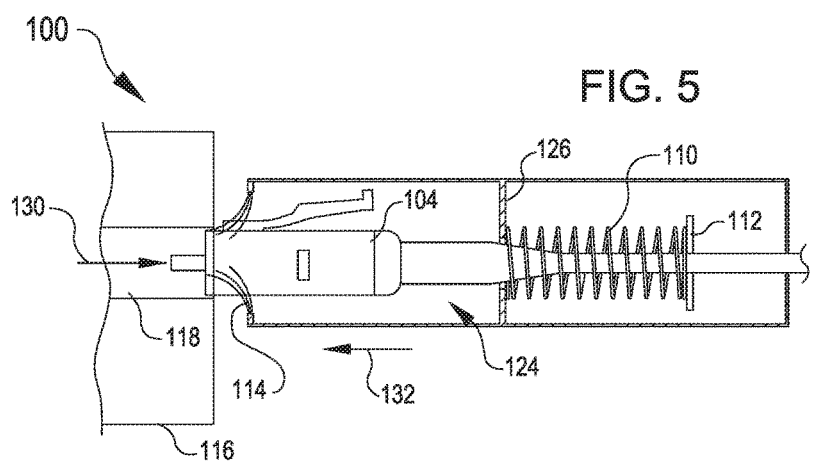
FIG. 5 is a side cut-away view showing a contamination prevention system with a plug positioned at least partially outside of a socket and with a cover positioned at least partially around the plug according to certain embodiments.

Referring to FIG. 5, the plug 104 may be extracted or removed from the socket 118 (e.g., as illustrated at arrow 130). Moving the plug 104 out of the socket 118 may increase a distance between the appliance 116 and the base 112, which may allow the biasing mechanism 110 to push the cover 108 further toward the appliance 116 (as at arrow 132) as a result of the energy stored in the spring compressed between the base 112 on the cable 102 and the internal wall 126 of the cover 108, for example. This may cause the bristles 114 to flex back into space vacated by the plug 104 as the cover 108 moves relative to the plug 104.

Figure 6:
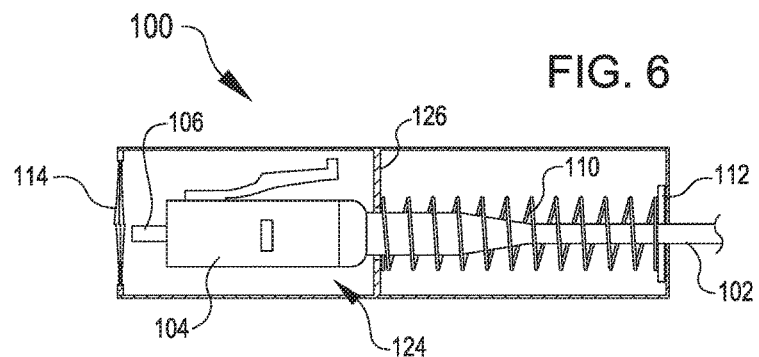
FIG. 6 is a side cut-away view showing a contamination prevention system with a cover enclosing a fiber ferrule of a plug according to certain embodiments.

Referring to FIG. 6, the cover 108 may be biased forward (e.g., toward the left in FIG. 6) to extend over the fiber ferrule 106 so that the fiber ferrule 106 is enclosed within the internal volume 124 of the cover 108. The bristles 114 may flex into an at rest configuration in which they block passage through the front face of the cover 108 to the fiber ferrule 106.

In some aspects, the cover 108 may be automatically retracted. For example, the cover 108 may automatically retract in response to insertion of the plug 104 into the socket 118. Referring to FIG. 6, the plug 104 and cover 108 may be moved together in the covered configuration. For example, an operator may grip a part of the cable 102 or a part of the cover 108 to move the combined assembly. Referring to FIG. 3, as the plug 104 is moved toward and/or into the socket 118, the cover 108 may contact a rim or other structure adjacent an edge of the socket 118 and be prevented from further forward movement as the plug 104 is moved further into the socket 118. This may cause the cover 108 to effectively move relative to the plug 104 (e.g., to move backward along the plug 104 as the plug 104 moves forward into the socket 118). Such relative movement between the cover 108 and the plug 104 may cause the cover 108 to act on the biasing mechanism 110 (e.g., to increase an amount of compression in a spring, such as shifting from the state shown in FIG. 6 to the state shown in FIG. 3), which may effectively prime the biasing mechanism 110 to be in a ready state to bias the cover 108 back over the plug 104 upon release of the plug 104 from the socket 118.

Other variations are possible. For example, although the cover 108 is shown in FIGS. 1-7 as having internal surfaces that are generally spaced apart from exterior surfaces of the plug 104, the cover 108 may alternatively be sized to be more or less closely spaced about the plug 104. In some embodiments, the cover 108 may be sized to conform with specifications for specific connector types, such as density parameters about how many connectors are to be fit within a given area of an appliance 116 or size parameters of corresponding components. As one illustrative example, if a specification for a set of LC connectors called for sockets 118 for respective plugs 104 to be spaced no more than 2 mm apart, covers 108 may be sized to be under 1 mm thick and arranged to be substantially flush against sides of respective plugs 104 of LC connector such that adjacent pairs of plugs 104 may each utilize up to half (e.g., 1 mm) of the 2 mm of space available between sockets 118. As another example, the cover 108 may be sized for engaging a rim defining the socket 118 into which a plug 104 is to be received so that the cover 108 will be pushed backward when the plug 104 is inserted into the socket 118.

As other examples of possible variations, although the biasing mechanism 110 is shown pressing against an internal wall 126 of the cover 108, the biasing mechanism 110 may engage an internal flange around the inner perimeter of the cover 108 or against any other part of the cover 108. For example, in some embodiments, the biasing mechanism 110 may press against an exterior of the cover 108.

Figure 7:
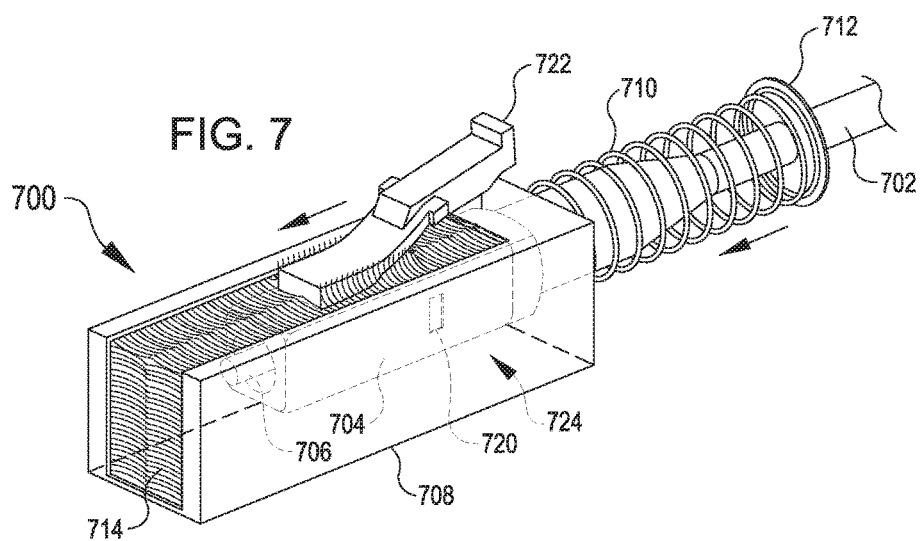
FIG. 7 is a perspective view of a contamination prevention system with a plug release mechanism that is maintained outside of a cover according to certain embodiments.

FIG. 7 shows a perspective view of another system 700. The system 700 is similar to the system 100 of FIG. 1. In the illustrated embodiment, the system 700 includes a cable 702, a plug 704, a fiber ferrule 706, a cover 708, a biasing mechanism 710, a base 712, bristles 714, latch mechanism parts 720, and release mechanism 722. These features are similar to the features of like names described with respect to FIG. 1, and, as such, description of various aspects of these features are not repeated.

In FIG. 7, the base 712 and the biasing mechanism 710 are located outside of the internal volume 724 defined by the cover 708. For example, the biasing mechanism 710 may press against a back end of the cover 708. In some embodiments, the biasing mechanism 710 may press against an internal part of the cover 708. For example, this may allow the biasing mechanism 710 and/or base 712 to be within the internal volume when the cover 708 is retracted from the fiber ferrule 706 and outside of the internal volume when the cover 708 is extended over the fiber ferrule 706. In some embodiments, the base 712 and/or biasing mechanism 710 may instead be arranged to be outside the internal volume when the cover 708 is retracted from the fiber ferrule 706 and inside of the internal volume when the cover 708 is extended over the fiber ferrule 706.

In FIG. 7, the release mechanism 722 is located outside of the internal volume 724 defined by the cover 708. For example, the cover 708 is shown having three main structural sides (e.g., bottom, left, and right) that are substantially continuous and rigid, and a fourth side (e.g., a top side) that features additional bristles 714 to permit a flexible construction that permits movement of the cover 708 relative to the release mechanism 722 so that the release mechanism 722 can be accessed regardless of the position of the cover 708 and so that dust or other particulate is blocked from passing through the space set aside for movement of the release mechanism 722 relative to the cover 708.

Figure 8:
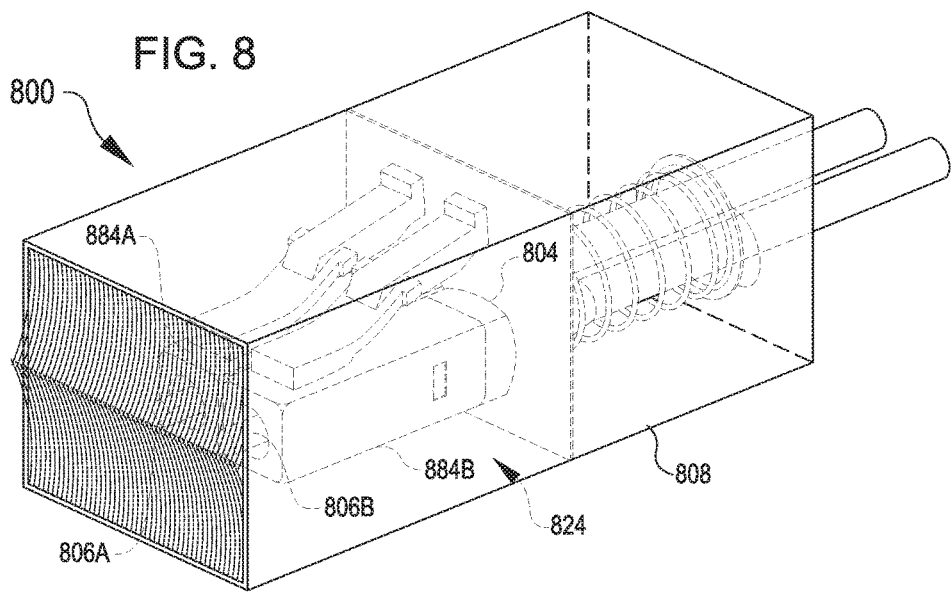
FIG. 8 is a perspective view of a contamination prevention system for a duplex plug according to certain embodiments.

FIG. 8 shows a perspective view of another system 800. The system 800 is similar to the system 100 of FIG. 1. In the illustrated embodiment, the system 800 includes features similar to the features of like names described with respect to FIG. 1, and, as such, description of various aspects of these features are not repeated.

In FIG. 8, the plug 804 includes a first plug body 884A in which a first fiber ferrule 806A is included and a second plug body 884B in which a second fiber ferrule 806B is included. Such a construction is commonly provided as part of a "duplex" plug 804. Accordingly, FIG. 8 illustrates that covers 808 disclosed herein may be arranged so that both a first fiber ferrule 806A of a first plug body 884A and a second fiber ferrule 806A of a second plug body 884B may be positioned within an internal volume of a cover 808.

FIGS. 9-10 show perspective views of another system 900. The system 900 is similar to the system 100 of FIG. 1. In the illustrated embodiment, the system 900 includes features similar to the features of like names described with respect to FIG. 1, and, as such, description of various aspects of these features are not repeated.

In FIG. 9, the cover 908 is positioned to extend over the fiber ferrule 906 in a covered configuration but does not extend over the plug 904 too. Instead, the cover 908 fits within the plug 904. In FIG. 10, the cover 908 is positioned within the plug in the uncovered configuration so that the ferrule 906 is exposed. Put another way, a part of the cover 908 is extendible out of the plug 904 and retractable into the plug 904 so as to be positioned at least partially within the plug 904 in the uncovered configuration and at least partially outside of the plug 904 in the covered configuration.

In some embodiments, the plug 904 may be pre-fabricated with the cover 908 already included. In some embodiments, the cover 908 and associated components (such as the biasing mechanism 910) may be introduced as retro-fitting components. For example, the biasing mechanism 910 and cover 908 may be sized to fit within an annulus around the ferrule 906 and between the ferrule 906 and a casing that forms an inner surface of the plug 904. In many existing LC connectors for example, such an annulus may provide a space into which a removable end cap can be inserted into the plug 904 and over the ferrule 906 for temporarily covering the ferrule 906. As an illustrative example, some LC connectors have an annulus sized to receive a cap that has an inner diameter of approximately 2.1 mm and an outer diameter of approximately 2.95 mm. In practice, such caps may be very easy to lose upon removal and thus fail to provide reliable ongoing protection for the ferrule 906 when not received in a socket. Any suitable mechanism may be utilized to prevent the cover 908 and associated components from inadvertently falling completely out of the annulus during movement of the plug 904 among horizontal, vertical, and/or other orientations. In some embodiments, an adhesive may be used to secure an end of the biasing mechanism 910 within the plug 904. In some embodiments, prongs 905 may be included on the cover 908 and/or an associated component (such as a base 912) to prevent the cover 908 from exiting the plug 904 beyond a predetermined amount. For example, the prongs 905 (and/or surrounding portion of the plug 904) may flex when subjected to a sufficient force to allow the cover 908 to enter into the annulus, yet may have sufficient resiliency to spring back and prevent the cover 908 from exiting the annulus under the influence of a relatively smaller force provided by the biasing mechanism 910.

FIG. 11 shows a perspective view of another system 1100. The system 1100 is similar to the system 100 of FIG. 1. In the illustrated embodiment, the system 1100 includes features similar to the features of like names described with respect to FIG. 1, and, as such, description of various aspects of these features are not repeated.

In FIG. 11, the plug 1104 may correspond to an MPO type connector. FIG. 11 shows by way of example that covers 1108 and associated components (such as bristles 1114) as described elsewhere herein can also be utilized for other forms of plugs 1104. For example, in contrast to the lever that corresponds to the release mechanism 122 in FIG. 2, the release mechanism 1122 of the plug 1104 in FIG. 11 is not lever based. Rather, the release mechanism 1122 may include a sliding collar operable to actuate components that can secure the plug 1104 relative to sockets and/or other plugs.

FIGS. 12-13 show a perspective views of another system 1200. The system 1200 is similar to the system 100 of FIG. 1. In the illustrated embodiment, the system 1200 includes features similar to the features of like names described with respect to FIG. 1, and, as such, description of various aspects of these features are not repeated.

In FIGS. 12-13, the plug 1204 may correspond to an MPO type connector. For example, FIG. 12 illustrates a fiber ferrule 1206 that may include multiple light transmission passageways 1207. The plug 1204 in FIG. 12 is also shown with alignment pins 1215, for example, which may be included or omitted from alignment openings 1217 to respectively configure the plug as a male connector or a female connector. In FIGS. 12-13, the collar 1222 is outfitted with bristles 1214 to serve as the cover 1208. FIGS. 12-13 thus show by way of example that some existing components may be retrofit or replaced with appropriate features to provide suitable covers 1208 as described herein. In operation, the cover 1208 can be biased toward a covered condition (e.g., as illustrated by arrow 1225 in FIG. 13) and moved toward an uncovered condition (e.g., as illustrated by arrow 1223 in FIG. 12) such as in response to engaging a socket, other plug, or other structure with sufficient force to overcome the bias toward the covered condition.

Based at least in part on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Various embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:
1. A system comprising:
an appliance comprising a computer server or a network hardware component, the appliance comprising a socket;

a plug comprising a body and a fiber ferrule incorporated into the body, the plug configured to be received in the socket into a seated configuration;

a latch mechanism comprising a first latch mechanism part attached to the socket and a second latch mechanism part attached to the plug, the first and second latch mechanism parts configured to engage one another to secure the plug in the socket in the seated configuration;

a release mechanism extending from the plug and operable to disengage the first and second latch mechanism parts from one another so as to facilitate removal of the plug from the seated configuration to an uninstalled configuration separate from the socket;

a cover slidably connected with the plug and defining an internal volume;

a spring operable upon removal of the plug from the socket to bias the cover toward a covered configuration in which the fiber ferrule is situated within the internal volume defined by the cover and away from an uncovered configuration in which the fiber ferrule is situated at least partially outside of the internal volume defined by the cover; and bristles positioned along a boundary of the internal volume of the cover and arranged to block dust entry through the bristles into the internal volume of the cover in the covered configuration, wherein the bristles are flexibly and resiliently bendable to permit passage of the fiber ferrule through the bristles in response to movement of the cover between the covered configuration and the uncovered configuration.

2. The system of claim 1, wherein the plug and the spring are positioned at least partially within the internal volume defined by the cover in the covered configuration.

3. The system of claim 1, wherein the release mechanism is positioned at least partially outside of the internal volume defined by the cover in the covered configuration.

4. The system of claim 1, wherein the bristles comprise microfiber bristles, and wherein the plug is an LC connector or an MPO connector.

5. A system comprising:
a cable;
a plug coupled with an end of the cable;
a fiber ferrule located in the plug;
a cover coupled with the cable and movable between a covered configuration in which the fiber ferrule is situated within an internal volume defined by the cover and an uncovered configuration in which the fiber ferrule is situated at least partially outside of the internal volume defined by the cover;
a biasing mechanism biasing the cover toward the covered configuration; and
blockers positioned along a boundary of or within the internal volume of the cover, the blockers arranged to block particulate entry through the blockers into the internal volume of the cover in the covered configuration, and the blockers bendable to permit passage of the fiber ferrule through the blockers in response to movement of the cover between the covered configuration and the uncovered configuration.

6. The system of claim 5, further comprising a base coupled with the cable at a fixed position, wherein the biasing mechanism is positioned between the base and a part of the cover and is compressible in response to movement of the cover away from the covered configuration and toward the uncovered configuration.

7. The system of claim 6, wherein the base is positioned at least partially within the internal volume defined by the cover in the covered configuration.

8. The system of claim 5, wherein the biasing mechanism is positioned at least partially within the internal volume defined by the cover in the covered configuration.

9. The system of claim 5, wherein the plug is positioned at least partially within the internal volume defined by the cover in the covered configuration.

10. The system of claim 5, wherein a part of the cover is extendible out of the plug and retractable into the plug so as to be positioned at least partially within the plug in the uncovered configuration and at least partially outside of the plug in the covered configuration.

11. The system of claim 5, wherein the fiber ferrule is a first fiber ferrule located in a first plug, wherein the system further comprises:
a second plug coupled with the end of the cable; and
a second fiber ferrule located in the second plug, wherein the second fiber ferrule is situated with the internal volume defined by the cover in the covered configuration and situated at least partially outside of the internal volume defined by the cover in the uncovered configuration.

12. The system of claim 5, wherein the plug further comprises:
a latch mechanism part for securing the plug in a socket; and
a release mechanism operable to disengage the latch mechanism part for facilitating removal of the plug from the socket, wherein the release mechanism of the plug is positioned at least partially outside of the internal volume defined by the cover in the covered configuration.

13. The system of claim 5, wherein the blockers comprise microfiber material.

14. A system comprising:
a cover slidable relative to a plug, the plug having a fiber ferrule extending from the plug, the cover defining an internal volume sized to receive the fiber ferrule extending from the plug;
a base sized and configured for mounting to the plug or to a cable extending from the plug;
a biasing mechanism sized and configured to engage the base and the cover in an arrangement biasing the cover toward a covered configuration in which the fiber ferrule is situated within an internal volume defined by the cover and away from an uncovered configuration in which the fiber ferrule is situated at least partially outside of the internal volume defined by the cover; and
blockers positioned along or within a boundary of the internal volume of the cover, the blockers arranged to block particulate entry through the blockers into the internal volume of the cover in the covered configuration, and the blockers movable to permit passage of the fiber ferrule through the blockers in response to movement of the cover between the covered configuration and the uncovered configuration.

15. The system of claim 14, wherein the blockers comprise bristles, flaps, tendrils, or fabric.

16. The system of claim 14, wherein the cover is sized relative to the plug such that, in the covered configuration, a release mechanism operable to disengage a latch mechanism part for facilitating removal of the plug from a socket is positioned outside of the internal volume defined by the cover.

17. The system of claim 14, wherein the cover is sized relative to the plug such that, in the covered configuration, the internal volume defined by the plug is positioned around a first fiber ferrule extending from a first plug body and around a second fiber ferrule extending from a second plug body.

18. The system of claim 14, wherein the cover is sized relative to the plug such that in the covered configuration the internal volume defined by the plug is positioned around the plug.

19. The system of claim 14, wherein the biasing mechanism is positioned at least partially outside the internal volume defined by the cover in the covered configuration.

20. The system of claim 14, wherein the base is positioned at least partially outside of the internal volume defined by the cover in the covered configuration.

* * * * *